United States Patent [19]

Ashkenazi

[11] Patent Number: 5,327,369

[45] Date of Patent: Jul. 5, 1994

[54] DIGITAL ADDER AND METHOD FOR ADDING 64-BIT, 16-BIT AND 8-BIT WORDS

[75] Inventor: Yaron Ashkenazi, Haifa, Israel

[73] Assignee: Intel Corporation, Santa Clara, Calif.

[21] Appl. No.: 40,676

[22] Filed: Mar. 31, 1993

[51] Int. Cl.$^5$ ................................................. G06F 7/50
[52] U.S. Cl. ..................... 364/787; 364/788; 364/749
[58] Field of Search ............... 364/787, 786, 788, 749

[56] References Cited

U.S. PATENT DOCUMENTS

| | | | |
|---|---|---|---|
| 4,707,800 | 11/1987 | Montoone et al. | 364/788 |
| 4,737,926 | 4/1988 | Vo et al. | 364/787 |
| 4,768,160 | 8/1988 | Yokoyama | 364/749 X |
| 4,905,180 | 2/1990 | Kumar | 364/787 |
| 4,914,617 | 4/1990 | Putrino et al. | 364/786 |
| 5,047,975 | 9/1991 | Patti et al. | 364/786 |
| 5,189,636 | 2/1993 | Patti et al. | 364/786 |

Primary Examiner—Tan V. Mai
Attorney, Agent, or Firm—Blakely, Sokoloff, Taylor & Zafman

[57] ABSTRACT

An adder for a 64-bit microprocessor which has three modes of operations, specifically, a 64-bit mode, a second mode where the adder in effect is four 16-bit adders and a third mode where the adder is, in effect, eight 8-bit adders. Two levels of Kogge-Stone trees are used, the first to generate group carries and propagate signals and the second for generating the carry signals for the 64-bit case. In the case of the 8-bit and 16-bit modes, the second level Kogge-Stone tree is not used, rather ordinary logic generates the appropriate carries. Exclusive ORing for conditional sums is performed in parallel with the generation of the carry signals.

20 Claims, 3 Drawing Sheets

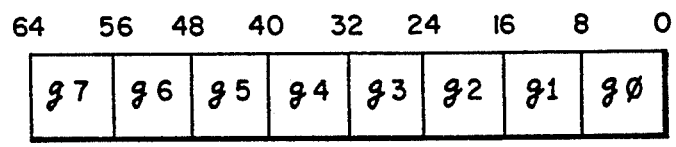
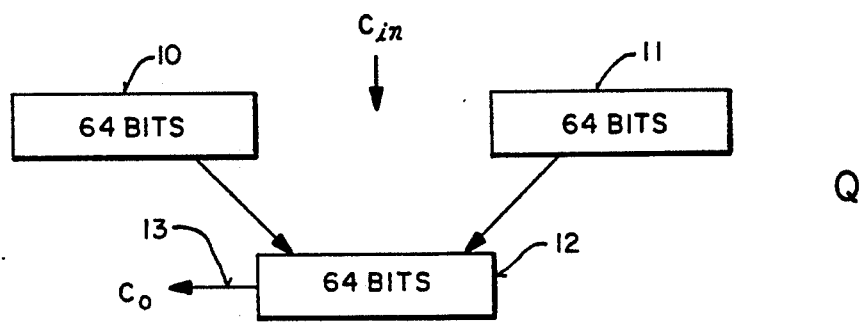
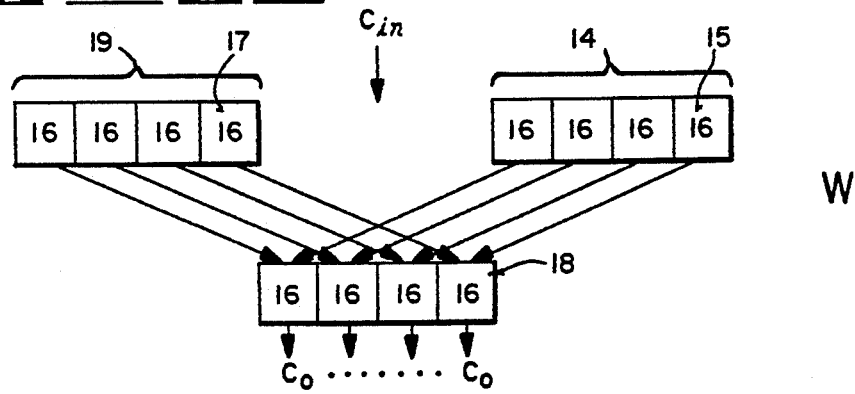
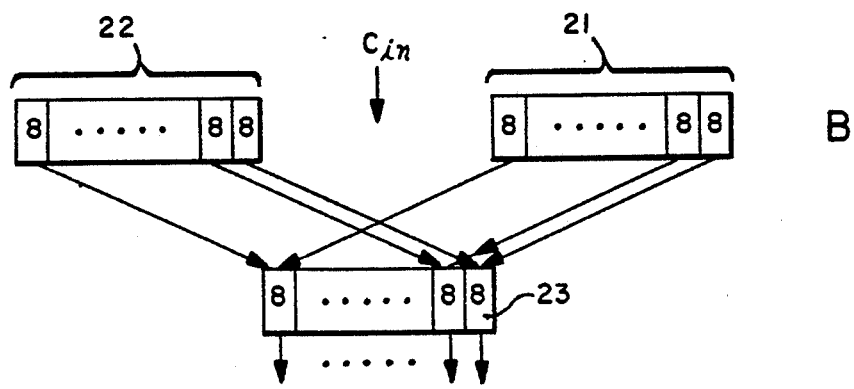

FIG_3A (PRIOR ART)
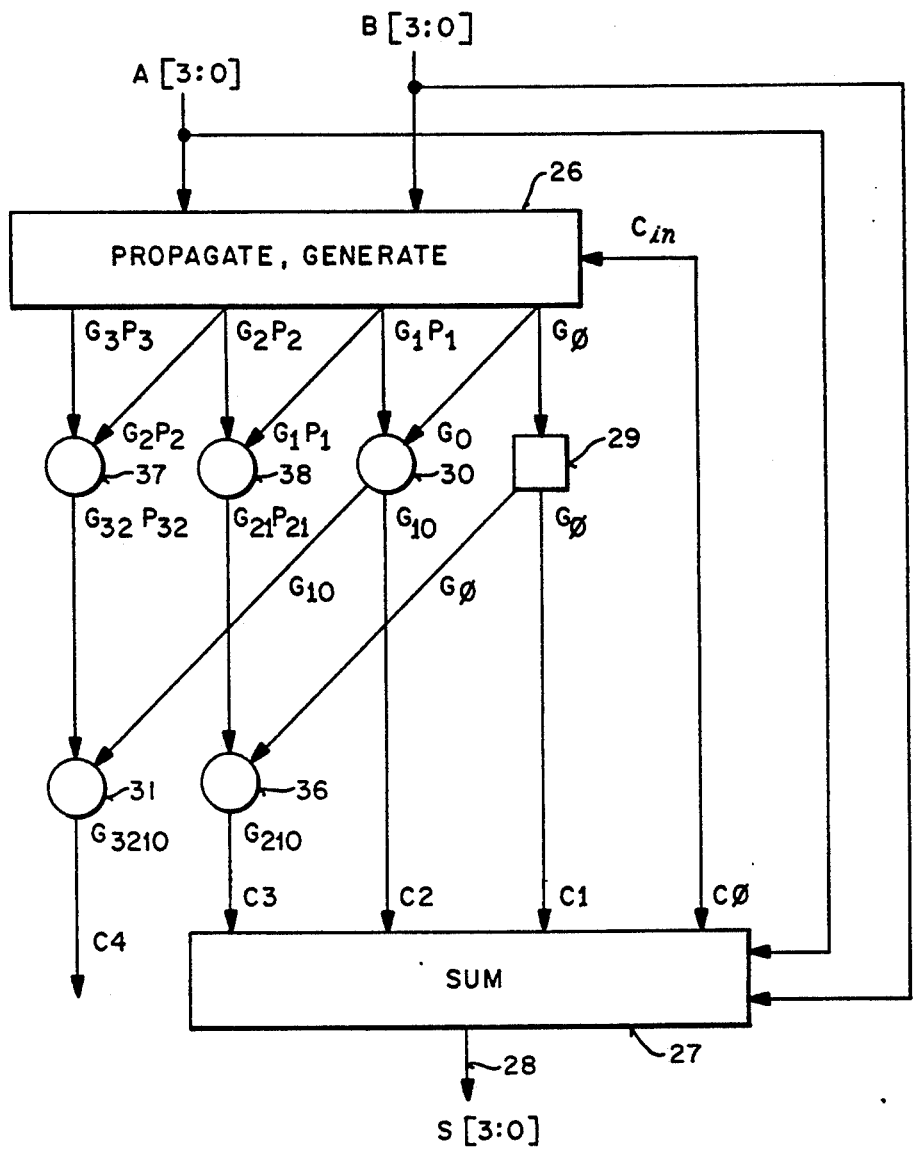
FIG_3B (PRIOR ART)
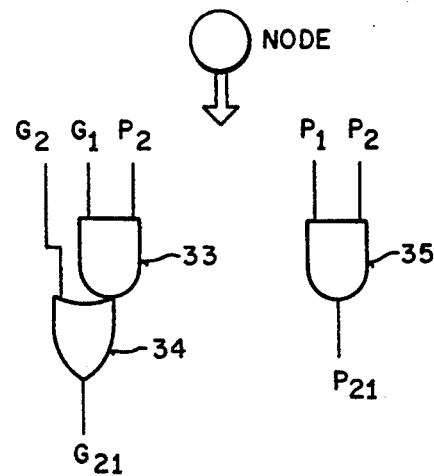

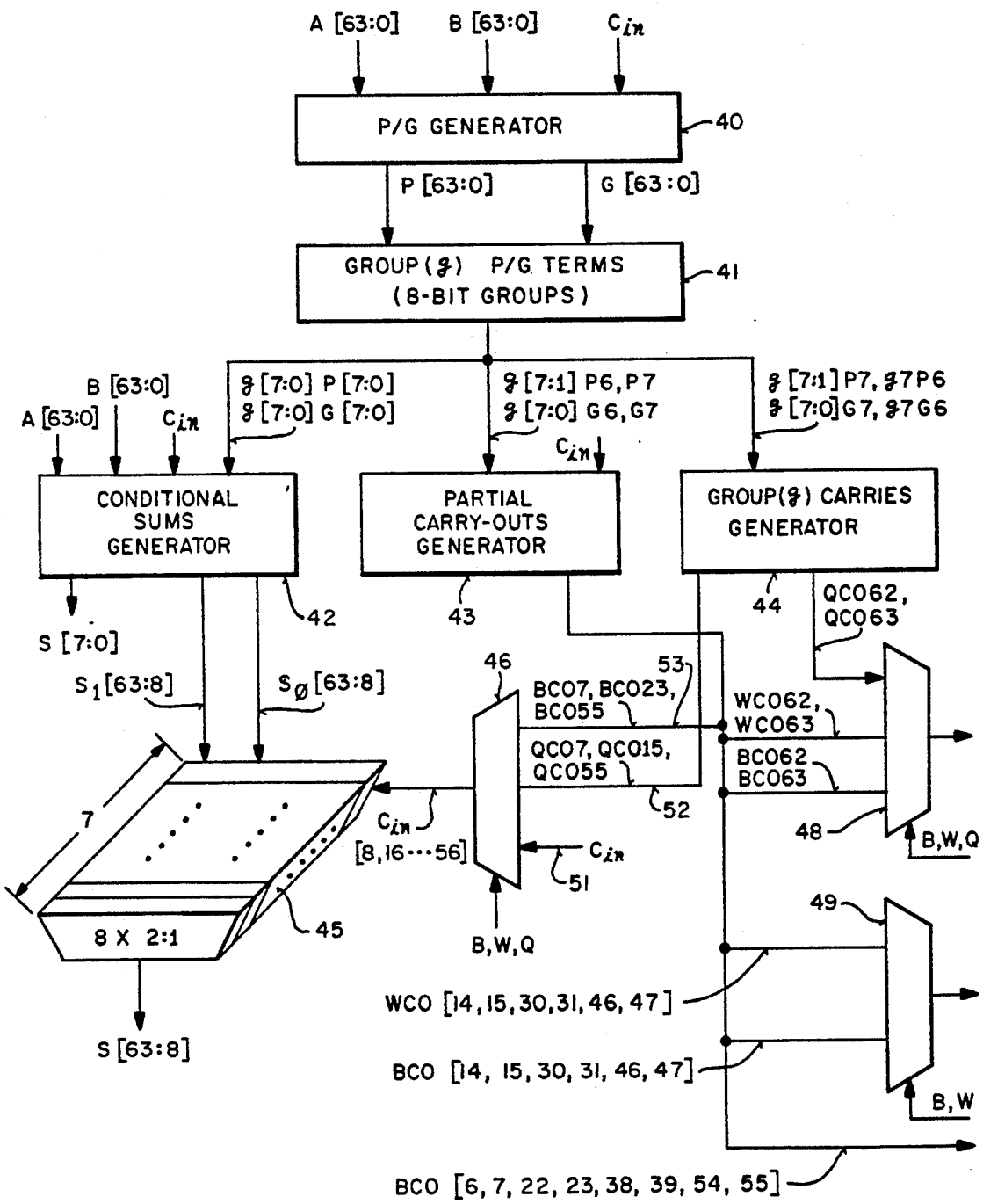

DIGITAL ADDER AND METHOD FOR ADDING 64-BIT, 16-BIT AND 8-BIT WORDS

FIELD OF THE INVENTION

1. The invention relates to the field of digital adders.
2. Prior art

Digital adders are well-known in the prior art and, for example, are essential elements in microprocessors. Full digital adders using look-ahead carry lines are disclosed in U.S. Pat. Nos. 4,737,926 and 4,905,180. Another prior art adder, the Kogge-Stone adder, is described in conjunction with FIGS. 3A and 3B.

The closest prior art known to the Applicant is U.S. Pat. No. 4,047,975 which describes a 16-bit adder that may operate as two 8-bit adders. The present invention describes a 64-bit adder which may operate as four 16-bit adders or eight 8-bit adders. As will be seen, the method and apparatus of the present invention is different than that employed in U.S. Pat. No. 5,047,975.

SUMMARY OF THE INVENTION

A method and apparatus for an adder which can selectively operate as a single 64-bit adder, four 16-bit or eight 8-bit adders is described. A first circuit is coupled to receive the input A and B signals, each of which has 64 bits. The first circuit provides first propagate and generate signals by logically combining the A and B signals for each of the 64-bits. Eight Kogge-Stone trees receive the first propagate and generate signals and provide eight groups of propagate and generate signals. A second circuit which includes an additional Kogge-Stone tree is coupled to the eight trees and provides first carry signals by considering the group of eight trees as a single first chain and second carry signals when the group of trees is considered as four 16-bit chains or eight 8-bit chains. A third circuit computes conditional sums for the A and B signals. A multiplexer uses either the first carry signals or second carry signals for selecting between the conditional sums. Additionally, a carry-in signal is used in the full adder. This signal also is used for controlling the multiplexer when the adder is operating in its 8-bit mode and 16-bit mode.

Other aspects of the present invention will be apparent from the following detailed description of the invention.

BRIEF DESCRIPTION OF THE DRAWINGS

FIG. 1 illustrates a 64-bit wide digital signal and the grouping that occurs in the currently preferred embodiment of the present invention.

FIG. 2A is a diagram used to illustrate the operation of the adder of the present invention when adding two 64-bit signals in its "quad" or "Q" mode.

FIG. 2B is a diagram used to illustrate the operation of the adder of the present invention when it operates in its "word" or "W" mode; specifically where it operates as four 16-bit adders.

FIG. 2C is a diagram used to illustrate the operation of the adder of the present invention in its "byte" or "B" mode where it operates as eight 8-bit adders.

FIG. 3A is a block diagram of a prior art Kogge-Stone adder.

FIG. 3B illustrates the logic employed in a portion of the adder of FIG. 3A.

FIG. 4 is a block diagram of the presently preferred embodiment of the present invention.

DETAILED DESCRIPTION OF THE PRESENT INVENTION

A digital adder and method of operation for digitally adding signals is described. In the following description, numerous specific details are set forth, such as specific number of bits, etc. in order to provide a thorough understanding of the present invention. It will be obvious to one skilled in the art, however, that the present invention may be practiced without these specific details. In other instances, well-known logic circuits have not been described in detail in order not to unnecessarily obscure the present invention.

In the currently preferred embodiment, the adder is realized employing well-known complementary metal-oxide-semiconductor (CMOS) technology and more specifically, BiCMOS technology.

OVERVIEW OF THE MODES OF OPERATION

Referring first to FIGS. 2A, 2B and 2C, the three modes of operation of the adder of the present invention are illustrated as modes "Q", "W" and "B". In the Q or quad mode, two 64-bit digital signals 10 and 11 are added to provide a sum signal 12. In this mode a Cin is also received in the full adder and a carry-out shown by line 13 is provided. Thus, in the Q mode the adder operates to add two 64-bit digital signals.

As shown in FIG. 2B in the W or word mode, the adder receives a first digital signal 14 and a second digital signal 19. Each of these digital signals are considered by the adder to comprise four 16-bit words such as word 15 and word 17. The adder adds one 16-bit word from one input digital signal to one 16-bit word of the other input digital signal. For instance, word 15 is added to word 17 to provide the sum, 16-bit word 18. Similarly, each of the other 16-bit words of the digital signal 14 are added to the other 16-bit words of the signal 19 as shown in FIG. 2B. Again, a carry-in signal is used. The same carry-in signal is used for all the words; one binary state of the carry-in bit is used for addition and the other for subtraction.

In the B or byte mode as shown in FIG. 2C, each input digital signal, such as signal 21, is considered to have eight 8-bit quantities. The first eight bits from signal 21 are added to the first eight bits of signal 22 to provide a sum signal 23. Similarly, each of the other 8-bit quantities of the signal 21 are added to the other 8-bit quantities of the signal 22 to provide 8-bit sums. Again, a carry-in signal is used (Cin); and as in the W mode the same carry-in signal is used for each of the byte-to-byte additions.

Thus, as can be readily seen from FIGS. 2A, 2B and 2C the adder of the present invention operates as a single 64-bit full adder (Q mode), four 16-bit adders (W mode) and eight 8-bit adders (B mode).

PRIOR ART KOGGE-STONE ADDER

The present invention makes use of Kogge-Stone adder technology and as will be seen, uses a modified Kogge-Stone adder. Before proceeding with the present invention, however, a brief review of a Kogge-Stone adder may be helpful. FIG. 3A shows a 4-bit Kogge-Stone adder which receives a 4-bit "A" signal and a 4-bit "B" signal. "A [3:0]" is a notation to indicate that bits 0 through 3 of the A input signal are coupled to the propagate/generate (P/G) circuit 26. Similarly, the four bits of the B signal are coupled to the circuit 26. The circuit also receives a Cin signal. The propagate and generate signals are generated within circuit 26 in an ordinary manner. For example, the propagate signal $P_1$ results from exclusively ORing $A_1$ and $B_1$. The generate signal $G_1$ results from ANDing $A_1$ and $B_1$.

The Kogge-Stone adder uses a tree structure to compute the carries for each bit as shown in FIG. 3A. The block 29 represents a dummy node; $G_0$ simply passed on to the sum circuit 27 and on to node 36. The other nodes of FIG. 3A perform the operation or operations shown in FIG. 3B. Nodes 30, 31 and 36 perform the function associated with the AND gate 33 and OR gate 34 of FIG. 3B. The other nodes such as node 37 additionally perform the function associated with the AND gate 35. The specific propagate and generate designations of FIG. 3B are those associated with the node 38. This node receives $G_1$ and $P_1$ and additionally, $G_2$ and $P_2$. $G_1$ and $P_2$ are ANDed by gate 33 and the result is ORed with $G_2$ by gate 34. This results in a generate signal, $G_{21}$. The propagate signals $P_1$ and $P_2$ at node 38 are ANDed as indicated by the AND gate 35 to provide the propagate signal $P_{21}$. The carry signal for each pair of bits is found since the generate signal is carried forward, note $G_0$ is coupled from node 29 to node 30 and $G_{10}$ is carried forward from node 30 to node 31.

In FIG. 3A the circuit 27 generates the sum for each bit pair and along with the respective carry, allows a sum signal to be generated as shown by line 28. The output from node 31 provides the carry signal for the sum S[3:0].

In order to implement a 64-bit Kogge-Stone adder, a six level tree is needed. This is why the delay through such adders increases logrithmically with respect to the length of the addition. Moreover, a six level tree is difficult to layout as an integrated circuit. For this reason, the present invention uses a modified Kogge-Stone adder as will be described which lessens the lay out problem and results in quicker addition. Also, as will be seen, the adder of the present invention, while a variant of the Kogge-Stone adder employs some of the characteristics of a carry-select adder.

PRESENTLY PREFERRED EMBODIMENT AND METHOD

First referring to FIG. 1, a 64-bit digital signal or number is shown. Each eight bits are shown partitioned into groups starting with group $g_0$ and ending in group $g_7$. Group $g_0$ contains bits 0 through 7, group $g_1$ contains bits 8-15, etc. In this application and the tables that follow, the lower case letter "g" is used to indicate group. The upper case "G" is used to designate a generate term. The upper case letter "P" designates a propagate term. By way of example, the expression g[7:0] P [7:0] indicates for each of the groups 0-7, the propagate terms 0-7. Similarly the expression g[7:0] G6, G7 means the generate terms 6 and 7 for the groups 0 to 7.

The presently preferred embodiment of the present invention as shown in FIG. 4, receives A and B, 64-bit digital signals, and a carry-in signal which are coupled to the P/G generator 40 and are also coupled to the conditional sums generator 42. The adder of FIG. 4 provides sum outputs S [7:0] from the generator 42 and S [63:8] from the multiplexers 45. These are the sum signals for the B, W and Q modes. The carry-out signal for the Q mode (QCO63) is provided at output of the generator 44. Various other carry-out signals are provided, particularly for the W and B modes at the outputs of the multiplexers 48 and 49; their use will be discussed later in this application.

The P/G generator 40 comprises ordinary AND and OR gates for forming (P) and generate (G) terms for bit pairs of the A and B samples. The G terms, specifically G[63:0] comprise the ordinary "generate" terms resulting from ANDing. For instance, $G_1$ is equal to the logical ANDing of A1 and B1. The P terms, or propagate terms, are somewhat different than those commonly used in that they result from the ORing of the bit pairs rather than the exclusive ORing. Thus, for example, P6 is equal to the non-exclusive ORing of A6 and B6.

The propagate and generate terms and the carry terms found with the P and G outputs of generator 40 do not require the exclusive ORing function. The exclusive ORing function is required to form the conditional sums within generator 42 and consequently the A and B signals are coupled to this generator where the exclusive ORing occurs. Importantly, ordinary ORing can be performed more quickly than exclusive ORing because there are fewer gate delays involved. For this reason, the output from generator 40 is available more quickly than if exclusive ORing was used. While the group generate and propagate terms are being found within circuit 41, the exclusive ORing can occur in parallel within the generator 42. This speeds up the operation of the adder of FIG. 4.

Circuit 41 comprises eight 8-bit Kogge-Stone trees. Each tree is designated as a group (g0-g7). The first group receives the P and G terms 0-7, the next group 8-15, etc. The trees of circuit 41 are used to determine the group generate and propagate terms. By analogy with the circuit shown in FIG. 3A the group generate terms are the carry terms. The propagate terms for each group, by analogy, with the tree of FIG. 3A: P0 (of FIG. 3A) is analogous to P0 (of circuit 41); P10 is analogous to P1; P210 is analogous to P2; P3210 is analogous to P3, etc. The output of the circuit 41 comprises g[7:0]P[7:0] and g[7:0]G[7:0]. That is, the propagate and generate terms for each of the eight groups.

The conditional sum generator receives all the propagate and generate terms for the eight groups (from circuit 41), the partial carry-outs generator 43 receives P6 and P7 for groups 1-7 and G6 and G7 for all the groups. The generator 44 receives P7 for groups 1-7 and P6 for group 7. Additionally, generator 44 receives G7 for all the groups and G6 for group 7.

In operation the conditionally sum generator 42 generates the conditional sums for each bit pair of the A and B signals. As previously mentioned, a propagate term based on exclusive ORing is used. This propagate term along with the generate and propagate terms for all the groups are used to form the conditional sums $S_0$ and $S_1$ in accordance with the following TABLE I.

TABLE I $P_{xi} = A_i XOR B_i$ $S_0(i) = P_{xi} XOR gG_i$ $S_1(i) = P_{xi} XOR (gG_i + gP_i);$ where "XOR" represents exclusive ORing and "+" represents logical ORing.

The conditional sums are grouped into groups of eight bits for bits 0-7, 8-15, etc. The first group for the sums S[7:0] is provided directly by the generator 42. The sum for this first byte is the same in all three modes (Q,W and B modes) and is determined immediately by the generator 42 since the generator also receives the Cin signal.

The other seven groups of 8-bit sums are each coupled to a different one of the multiplexers 45. Each multiplexer of multiplexers 45 thus receives 8×2 inputs that is, 16 inputs and selects eight outputs. More specifically, the first multiplexer receives $S_1[15:8]$ and $S_0[15:8]$ a selection is made between these $S_1$ and $S_0$ terms. Similarly, the last of the seven multiplexers receives $S_1[63:56]$ and $S_0[63:56]$ and selects either the $S_1$ or $S_0$ signals.

The multiplexers 45 receive control signals from the multiplexer 46 which signals control the selection of the $S_1$ or $S_0$ signals for each of the multiplexers 45.

The multiplexer 46 is controlled by mode signals which indicates which mode of operation is desired (B, W or Q). In the Q mode, the signals on lines 52 are selected by multiplexer 46 and are used to control the multiplexers 45. In the W mode, the carry signals coupled to lines 53 are selected by multiplexer 46 to control some of the multiplexers 45; the Cin signal on line 51 controls others of the multiplexers 45, as will be described in the W mode. In the B mode, line 51 is selected by multiplexer 46 and the Cin signal is used to select between the $S_1$ and $S_0$ signals in all of the multiplexers 45.

In the Q mode, carry signals are found by considering the propagate and generate signals for all the groups as one continuous chain. These signals, for each of the groups are designated as QC07, QCO15 ... QCO55. In the word mode, the adder in effect, is four 16-bit adders. The Cin signal from line 51 is used as the carry-in for each of the four words. Thus, the carry-in signal selects between the $S_1$ and $S_0$ signals within the generator 42 for S[7:0] and is used to select between the $S_1$ and $S_0$ terms in the second, fourth and sixth multiplexers of the seven multiplexers 45. The first, third, fifth and seventh multiplexers are controlled by BCO7, BCO23, BCO39 and BCO55, respectively. In effect, in the W mode, the P/G terms are considered in four 16-bit groups that is, four shorter chains than used in the Q mode to develop the carry signals used in the W mode. In the B mode the carry-in is the same for all of the multiplexers.

The output of the multiplexer 46 may be looked at as being the carry-IN signal for bits, 8, 16 ... 56 as shown in FIG. 4. In the Q mode, QCO7 is QCIN8, QCO15 is QCO16, etc. In the W mode, WCIN 0, 16, 32 and 48 is Cin; WCIN8 is BCO7, BCIN24 is BCO23, etc. In the B mode, BCIN8 through BCIN56 is Cin.

CARRY GENERATION

In the Q case, the generator 44 generates QC07, 15, 23, 31, 39, 47, 55 62 and 63. All of these carry out signals less QCO62 AND QCO63 are coupled to the multiplexer 46 on lines 52. These signals may be generated using ordinary gates from the group P and G signals shown coupled to the generator 44. However, in the currently preferred embodiment, an 8-bit Kogge-Stone adder is used. The specific logic performed by generator 44 is shown below in TABLE II. In TABLE II and in subsequent tables, the "*" symbol designates ANDING and the "+" symbol designates ordinary ORing.

TABLE II

QCO7 = g0G7
QCO15 = g1G7 + g1P7*g0G7
QCO23 = g2G7 + g2P7*g1G7 + g2P7*G1P7*g0G7
QCO31 = g3G7 + g3P7*g2G7 +g3P7*g2P7*g1G7 + g3P7*g2P7*g1P7*g0G7

TABLE II-continued

QCO39 = g4G7 + g4P7*g3G7 +g4P7*g3P7*g2G7 + g4P7*g3P7*g2P7*g1G7 + g4P7*g3P7*g2P7*g1P7*g0G7
QCO47 = g5G7 + g5P7*g4G7 +g5P7*g4P7*g3G7 + g5P7*g4P7*g3P7*g2G7 + g5P7*g4P7*g3P7*g2P7*g1G7 + g5P7*g4P7*g3P7*g2P7*g1P7*g0G7
QCO55 = g6G7 + g6P7*g5G7 +g6P7*g5P7*g4G7 + g6P7*g5P7*g4P7*g3G7 + g6P7*g5P7*g4P7*g3P7*g2G7 + g6P7*g5P7*g4P7*g3P7*g2P7*g1G7 + g6P7*g5P7*g4P7*g3P7*g2P7*g1P7*g0G7
QCO62 = g7G6 + g7P6*g6G7 +g7P6*g6P7*g5G7 + g7P6*g6P7*g5P7*g4G7 + g7P6*g6P7*g5P7*g4P7*g3G7 + g7P6*g6P7*g5P7*g4P7*g3P7*g2G7 + g7P6*g6P7*g5P7*g4P7*g3P7*g2P7*g1G7 + g7P6*g6P7*g5P7*g4P7*g3P7*g2P7*g1P7*g0G7
QCO63 = g7G7 + g7P7*g6G7 +g7P7*g6P7*g5G7 + g7P7*g6P7*g5P7*g4G7 + g7P7*g6P7*g5P7*g4P7*g3G7 + g7P7*g6P7*g5P7*g4P7*g3P7*g2G7 + g7P7*g6P7*g5P7*g4P7*g3P7*g2P7*g1G7 + g7P7*g6P7*g5P7*g4P7*g3P7*g2P7*g1P7*g0G7

The partial carry-out generator 43 generates BCO7, 23, 39 and 55 for use by the multiplexer 46 and additionally, generates WCO14, 15, 30, 31, 46, 47, 62 and 63 which are coupled to multiplexers 48 and 49 as will be discussed. These carry-out signals are generated using ordinary logic which implements the equations shown below in TABLE III.

TABLE III

WCO14 = g1G6 + g1P6*g0G7

WCO15 = g1G7 + g1P7*g0G7

WCO30 = g3G6 + g3P6*g2G7 + g3P6*g2P7*Cin

WCO31 = g3G7 + g3P7*g2G7 + g3P7*g2P7*Cin

WCO46 = g5G6 + g5P6*g4G7 + g5P6*g4P7*Cin

WCO47 = g5G7 + g5P7*g4G7 + g5P7*g4P7*Cin

WCO62 = g7G6 + g7P6*g6G7 + g7P6*g6P7*Cin

WCO63 = g7G7 + g7P7*g6G7 + g7P7*g6P7*Cin

The partial carry-out generator 43 also generates some intermediate carry-out signals for the byte case; specifically, BCO6, 7, 14, 15, 22, 23, 30, 31, 38, 39, 46, 47, 54, 55, 62 and 63. These are coupled to the multiplexers 46, 48 and 49. These signals are generated using ordinary logic which implements the equations shown below in TABLE IV.

TABLE IV

BCO6 = g0G6

BCO7 = g0G7

BCO14 = g1G6 + g1P6*Cin

BCO15 = g1G7 + g1P7*Cin

BCO22 = g2G6 + g2P6*Cin

BCO23 = g2G7 + g2P7*Cin

BCO30 = g3G6 + g3P6*Cin

BCO31 = g3G7 + g3P7*Cin

BCO38 = g4G6 + g4P7*Cin $$BCO39 = g4G7 + g4P7 * Cin$$

$$BCO46 = g5G6 + g5P6 * Cin$$

$$BCO47 = g5G7 + g5P7 * Cin$$

$$BCO54 = g6G6 + g6P6 * Cin$$

$$BCO55 = g6G7 + g6P7 * Cin$$

$$BCO62 = g7G6 + g7P6 * Cin$$

$$BCO63 = g7G7 + g7P7 * Cin$$

In its currently preferred embodiment, the adder is used in connection with the handling of data for multimedia instructions and computer graphics instructions. In some cases, for example, two 16-bit words are combined that may represent colors and some carry-out signals may be used for various reasons in connection with colors. These carry-out signals are provided at the outputs of multiplexers 48 and 49. Multiplexer 48 selects one of three outputs: QCO62, 63 for Q mode; WCO62, 63 for the W mode and BCO62, 63 for the B mode. Multiplexer 49 selects one of two outputs: WCO[14, 15, 30, 31, 46, 47] for the W mode and BCO[14, 15, 30, 31, 46, 47] for the B mode. BCO[6, 7, 22, 23, 38, 39, 54, 55] are provided in all modes.

Thus, an adder has been described that operates as a single 64-bit adder, four 16-bit adders and eight 8-bit adders.

What is claimed is:

1. An adder comprising:
   a first circuit coupled to receive A and B signals, each of said A and B signals comprising a plurality of bits, said first circuit logically combining said A and B signals to provide first propagate and generate signals;
   a group of second circuits each coupled to receive a plurality of said first propagate and generate signals from said first circuit, said group of second circuits providing a plurality of group propagate and generate signals;
   a third circuit coupled to said group of second circuits for providing first carry signals from said group propagate and generate signals taken as a continuous chain and second carry signals from said group propagate and generate signals taken in chains shorter than said continuous chain;
   a fourth circuit coupled to said group of second circuits and to receive said A and B signals for computing conditional sums for said A and B signals;
   a first selector coupled to said third circuit for selecting between said first carry signals and second carry signals, said first selector being controlled by an external mode signal; and,
   a second selector coupled to said fourth circuit and said first selector for selecting between said conditional sums, said second selector being controlled by one of said first carry signals and said second carry signals.

2. The adder defined by claim 1 wherein each of said second circuits comprise a Kogge-Stone tree.

3. The adder defined by claim 2 wherein said third circuit comprises another Kogge-Stone tree.

4. The adder defined by claim 1 wherein said adder receives a carry-in signal and wherein said carry-in signal is connected to said first selector and is also used for selecting between the conditional sums of said fourth circuit.

5. The adder defined by claim 4 wherein said first circuit logically ORs and ANDs each bit of said A and B signals to provide said first propagate and generate signals.

6. The adder defined by claim 5 wherein said fourth circuit is coupled to receive said group propagate and generate signals, said A and B signals and said carry-in signal.

7. A 64-bit adder for adding two 64-bit digital signals, A and B, comprising:
   a first circuit coupled to receive the A and B signals for logically combining said signals to provide first propagate and generate signals;
   a group of eight Kogge-Stone trees each coupled to receive a plurality of said first propagate and first generate signals from said first circuit, said group of trees providing a plurality of group propagate and generate signals;
   a second circuit including an additional Kogge-Stone tree coupled to said group of trees for determining first carry signals when said group of eight trees are considered as a single first chain and second carry signal signals when said group of trees are considered as a plurality of second chains, each of said second chains being shorter than said first chain;
   a third circuit for computing conditional sums for said A and B signals; and,
   a multiplexer for selecting between said conditional sums, said multiplexer being controlled by one of said first carry signals or second carry signals.

8. The adder defined by claim 7 wherein said first circuit ORs and ANDs said A and B signals.

9. The adder defined by claim 8 wherein said first circuit receives a carry-in signal.

10. The adder defined by claim 9 wherein said multiplexer is controlled in part by said carry-in signal.

11. The adder defined by claim 7 wherein said second circuit provides additional carry signals different than said first and second carry signals.

12. A method for adding two numbers, A and B, each having a plurality of bits, comprising the steps of:
   generating propagate and generate terms for the numbers A and B;
   generating propagate and generate terms for groups of the propagate and generate terms for the numbers A and B;
   finding one of, first carry terms for all the groups as single chain or second carry terms for the groups considered as a plurality of chains, each shorter than the single chain;
   generating group conditional sums for at least two of the groups;
   using the first carry terms or second carry terms to select sums from the conditional sums.

13. The method defined by claim 12 wherein a carry-in is used in the generation of the propagate and generate terms for the numbers A and B.

14. The method defined by claim 13 wherein the using step selectively uses the first carry terms, the second carry terms and the carry-in to select sums from the conditional sums.

15. The method defined by claim 14 wherein the step of generating propagate and generate terms for the numbers A and B, comprises ANDing and ORing the bits in the numbers, A and B.

16. The method defined by claim 15 wherein generating group conditional sums includes use of the A and B numbers and the group propagate and generate terms

17. A method for adding two 64-bit numbers comprising the steps of:
   generating propagate and generate terms for the two 64-bit numbers;
   grouping the propagate and generate terms for the two 64-bit numbers into eight groups;
   generating propagate and generate terms for each of the eight groups;
   finding first carry terms for the eight groups when considering the groups as a single chain;
   finding second carry terms for the eight groups when considering the groups as a plurality of chains each of which is shorter than the single chain;
   generating group conditional sums for at least two of the eight groups; and
   using one of said first carry terms and second carry terms to select sums from the conditional sums.

18. The method defined by claim 17 wherein generating propagate and generate terms for the numbers A and B comprises the steps of ORing and ANDing the bits of the numbers A and B.

19. The method defined by claim 18 wherein the step of generating propagate and generate terms for the numbers A and B includes using a carry-in term.

20. The method defined by claim 19 wherein the step of using one of the first carry terms and second carry terms comprises the step of using one of the first carry terms, second carry terms or carry-in signal to select sums from the conditional sums.

* * * * *

UNITED STATES PATENT AND TRADEMARK OFFICE
CERTIFICATE OF CORRECTION

PATENT NO. : 5,327,369
DATED : July 5, 1994
INVENTOR(S) : Yaron Ashkenazi

It is certified that error appears in the above-indentified patent and that said Letters Patent is hereby corrected as shown below:

Column 6, Line 68;   Delete "7";   Insert in place thereof --6--

Signed and Sealed this

Nineteenth Day of September, 1995

Attest:

BRUCE LEHMAN

*Attesting Officer*          *Commissioner of Patents and Trademarks*